United States Patent

[11] 3,573,344

[72] Inventor Robert C. Snyder
 202 Tomahawk Trail, Pottawattamie Park,
 La Porte, Ind. 46360
[21] Appl. No. 7,548
[22] Filed Feb. 2, 1970
[45] Patented Apr. 6, 1971

[54] TELESCOPICALLY ADJUSTABLE JUNCTION BOX
 8 Claims, 7 Drawing Figs.
[52] U.S. Cl. .................................................... 174/57,
 174/48, 220/8
[51] Int. Cl. ...................................................... H02g 3/10
[50] Field of Search ........................................... 174/48, 49,
 57; 220/3.7, 8; 285/302; 137/369, 370

[56] References Cited
 UNITED STATES PATENTS
1,875,101 8/1932 Morrell ......................... 220/3.7X
3,433,886 3/1969 Myers ............................ 174/57

FOREIGN PATENTS
91,921 8/1959 Netherlands .................. 174/48

Primary Examiner—Lewis H. Myers
Assistant Examiner—D. A. Tone
Attorney—Walter Leuca ABSTRACT: A telescopically adjustable junction box for installation in conduit runs which expands and contracts with the support structure at the expansion joints thereof. This box comprises an open end insert box telescopically movable in the open end of a cover box. Runners are provided on the exterior of the insert box for riding on the inside face of the cover box sides. Conduit holes are provided in the closed ends of the cover and insert boxes for inserting and connecting thereto the ends of the conduits. The electric wires span the space between the conduit pipe ends with sufficient slack for expansion takeup. The enlarged interior capacity provided in the boxes allows lateral wire movement during contraction, manual handling of the wires for pull through operation, and splice connections for tapping and distribution.

PATENTED APR 6 1971

INVENTOR.
ROBERT C. SNYDER

BY Watts Leuca

ATTORNEY

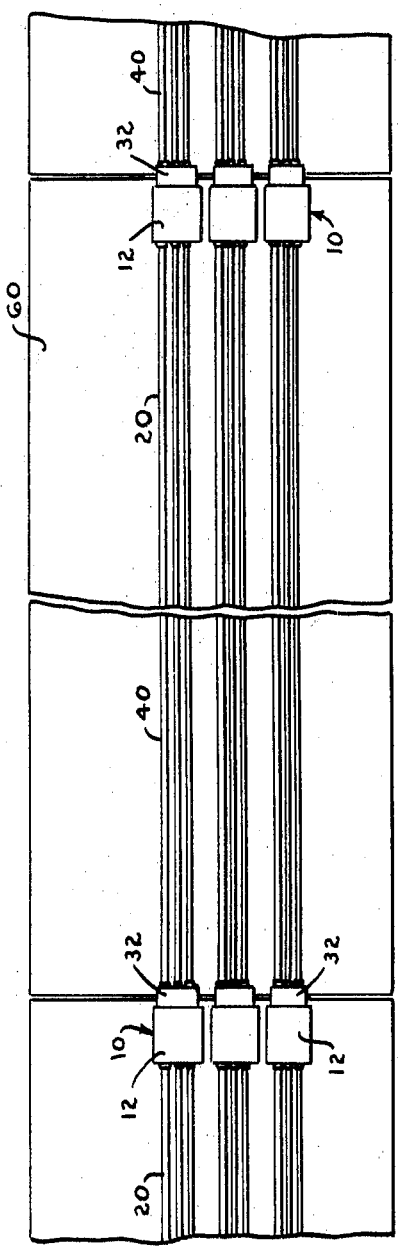
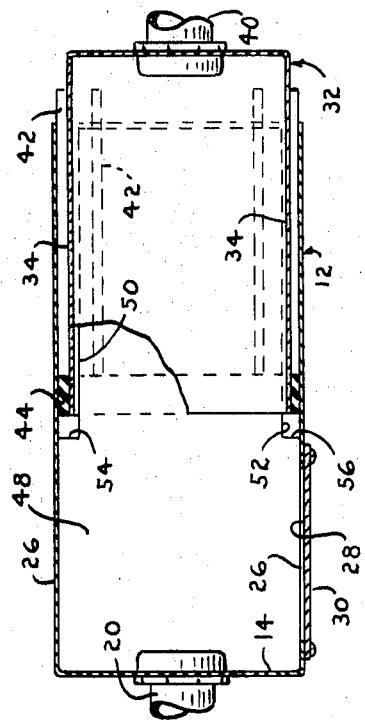
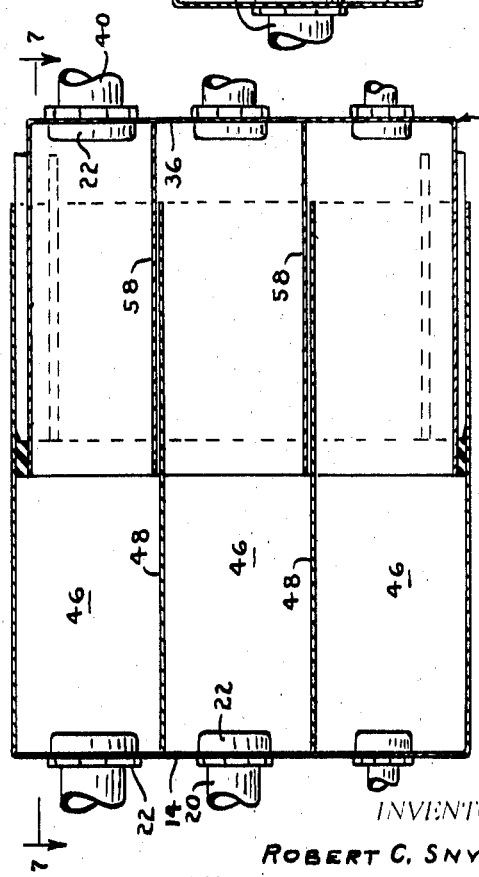

TELESCOPICALLY ADJUSTABLE JUNCTION BOX

BACKGROUND OF THE INVENTION

This invention relates to junction boxes for electric wire conduits and more particularly to a telescopically adjustable junction box.

My invention is directed to the problem resulting from installing long conduit runs in large or long buildings or like support structures, within or without raceways, concealed or exposed. Industrial buildings are inordinately long and the installation therein of conduit runs require the use of junction boxes supported on the building structure to connect the end of lengths of conduit run. Junction boxes are also supported at points where several conduit lines intersect for purposes of tapping or line distribution. In long conduit runs the building structure which support the conduits experiences considerable expansion and contraction and is generally provided with expansion joints to allow for this movement. Accordingly, long or continuous run of conduits will be required to be constructed so as to allow for expansion or contraction at these locations of the supporting building structure. In the prior art this is accomplished by providing a slipover pipe over the spaced ends of adjoining conduits so that the conduits, fixed to the building structure on each side of the expansion joint, will be permitted to move with the supporting structure as expansion or contraction occurs. The disadvantage of this prior art practice is that the slipover pipe allows little room for the wires to be adequately accommodated other than for very small contraction or expansion. A hazard is also present in that repeated movement of the pipe ends, brought about by the contractual or expansion movement of the support structure, may rub against the wire insulation which can cause breaks therethrough since there is usually little clearance between the wires and the conduit.

SUMMARY OF THE INVENTION

In order to deal with the problem of long conduit runs which are supported by building structures which are long and which have one or more expansion joints, I have invented a new and novel conduit run box for installation singly or in gangs in conduit runs at joints of expansion of buildings which is expandible and contractable with the supporting building structure, and which may serve as junction boxes, full boxes or outlet boxes. The conduit box of my invention includes an open end cover box and an open end insert box telescopically movable in the open end of the cover box. Runners are provided on the exterior of the insert box for riding on the inside face of the cover box sides. Conduit holes are provided in the closed ends of the cover and insert boxes for inserting and connecting thereto the ends of the conduits. The electric wires span the space between the conduit pipe ends with sufficient slack for expansion takeup. The enlarged interior capacity provided in the boxes allows lateral wire movement during contraction, manual handling of the wires for pullthrough operation, and splice connections for tapping and distribution.

BRIEF DESCRIPTION OF THE DRAWING

Other objects and advantages than those described above will become apparent upon a careful reading of the following detailed description taken with reference to the drawings which illustrate a preferred embodiment of my invention. In the drawings:

FIG. 5 is an elevation of a wall along which conduit runs are supported showing junction boxes of my invention supported at the expansion joints of the wall, the continuity of which is shown broken;

FIG. 6 is a sectional side view of a modified junction box of my invention provided with magnetic shield panels to compartmentize the interior thereof; and FIG. 7 is a top view of the modified junction box sectioned along lines 7-7 of FIG. 6.

DESCRIPTION OF THE PREFERRED EMBODIMENT

Figure 1:
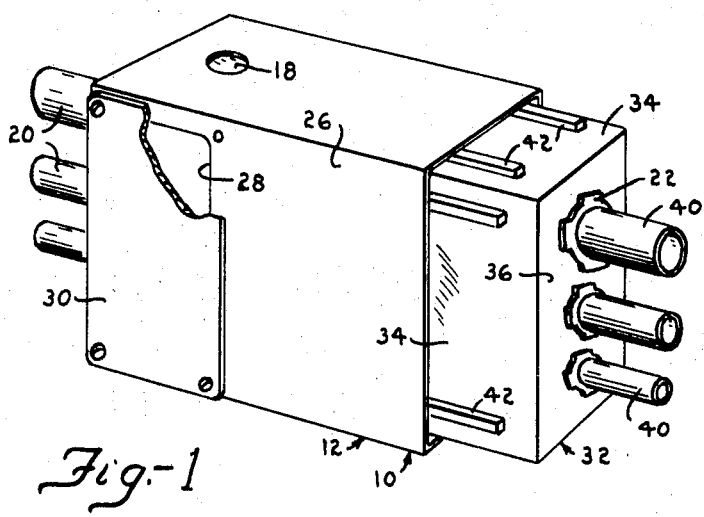
FIG. 1 is a perspective view of the junction box of my invention, the cover plate being shown partially broken away to reveal the access opening.
Figure 2:
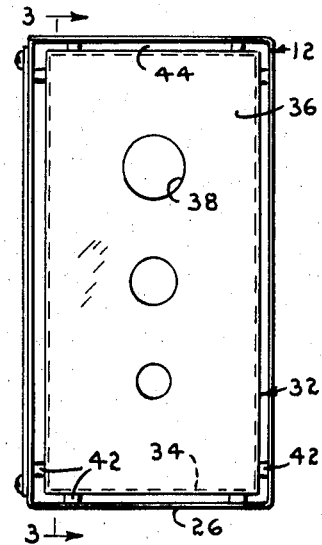
FIG. 2 is an end view of the junction box assembly as viewed from the insert box end.
Figure 3:
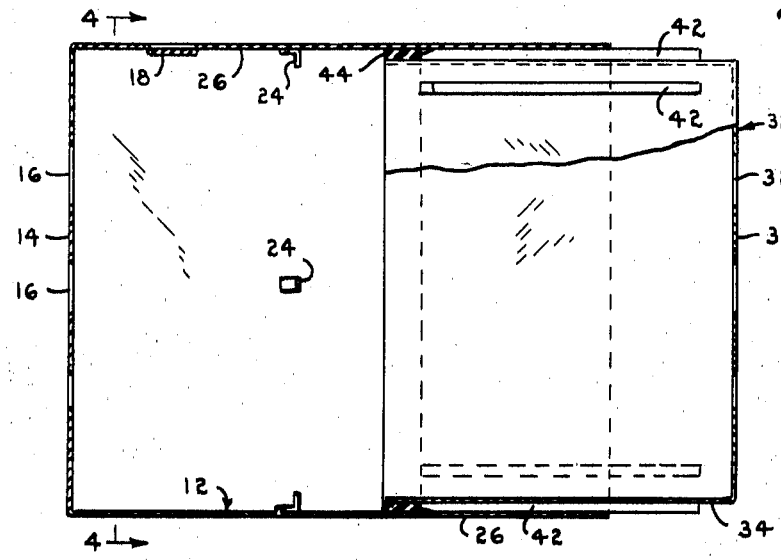
FIG. 3 is a side view of my invention sectioned along lines 3-3 of FIG. 2.
Figure 4:
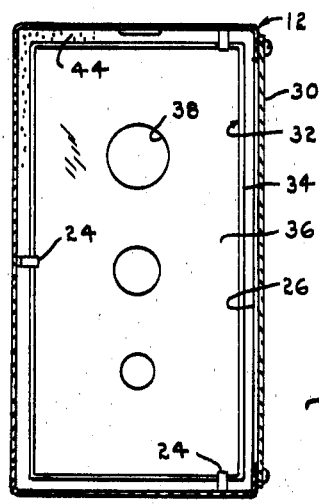
FIG. 4 is an end view as viewed from the cover box end sectioned along lines 4-4 of FIG. 3.

With reference now to the drawings, the junction box of my invention is designated generally by the numeral 10. It comprises an open end cover box 12 having closed end 14 thereof provided with one or more conduit holes 16 or conduit knockouts 18 for receiving therethrough the end of conduit pipe 20 for connection thereto by means of conventional connectors 22. Cover box 12 is provided with stop means 24 which project from the interior of several of the sidewalls 26 thereof. One or more of sidewalls 26 of cover box 12 is provided with an opening such as 28 sufficiently large for hand entry. Cover plate 30 is removably connected to sidewall 26 over opening 28 by any convenient fastening means. Opening 28 is located rearward of stop means 24 in order not to be overlapped or partially covered by the inside end of insert box 32. Insert box 32 is also an open end box having sidewalls 34 and a closed end 36 which is formed with one or more conduit holes 38 for receiving therethrough conduit pipes 40 for connection thereto by means of conventional connectors 22. Insert box 32 is further provided with laterally-spaced, longitudinally parallel rail members 42 on each sidewall 34 thereof. Accordingly, there is no surface contact between any of the corresponding sidewalls 26 and 34 of cover box 12 and insert box 32 respectively since they are laterally spaced apart to accommodate rail members 42 therebetween. I have found that runner contact by rails 42 allows easy, nonbinding telescopic movement of insert box 32 in cover box 12 without lubrication. Dust seal 44 is bonded to the open end of insert box 32 around the perimeter thereof which is effective to prevent dirt or dust from entering to the interior of the junction box 10 of my invention.

In FIGS. 6 and 7, I illustrate a modified junction box 10 of my invention formed with shielded chambers or compartments 46 to prevent or minimize unwanted induction of current between adjacent lines which should not occupy the same enclosure. I accomplish this by fixing in the interior of cover box 10 one or more generally rectangular panel members 48 formed from magnetic shield material such as steel or iron to divide the interior thereof in two or more compartments extending the length of cover box 12. Each panel member 48 is notched at both of the edges thereof such as at 50 and 52, a part of the length thereof. Connection of panel members 48 to the interior surfaces of sidewalls 26 and closed end 14 of cover box 12 such as by weldments is made to the portion thereof into which insert box 32 does not extend in its most telescopically contracted position. Shouldered ends 54 and 56 of notches 50 and 52 respectively in panel members 48 serve as stop means for insert box 32, the open end of which abuts thereagainst.

Insert box 32 is similarly provided with rectangular panel members 58 equal in number to panel members 48 in cover box 12. Panel members 58 are connected to the interior surface of closed end 36 and opposite sidewalls 34 longitudinally aligned with corresponding panel members 48 but laterally offset therefrom so that panel members 58 may slide by panel members 48 when insert box 32 is telescopically movable in cover box 12 as shown in FIG. 6. Hand opening 28 is provided in a sidewall 26 spanning across panel members 48 so that access may be had to each compartment 46. Any convenient means may be provided for supporting the variable size junction box 10 of my invention such as holes drilled in one of the sidewalls of cover box 12 for bolt or screw connection to supporting wall structure 60, or by any convenient bracket device.

I claim:
1. A junction box comprising:
a cover box having sidewalls, an open end, and a closed end;
said closed end having a hole for communicating the interior of said cover box with a conduit pipe connected to said closed end,
an insert box having sidewalls, an open end, and a closed end,
said closed end having a hole for communicating the interior of said insert box with a conduit pipe connected to said closed end;
rail members on said sidewalls of said insert box; and
said insert box being telescopically movable in said cover box on said rail members.

2. A junction box comprising:
a cover box having sidewalls, an open end, and a closed end;
said closed end having a hole for connecting to said closed end a conduit pipe,
one of said sidewalls having an opening for manual access to the interior thereof;
an insert box having sidewalls, an open end, and a closed end;
said closed end having a hole for connecting to said closed end a conduit pipe,
rail members on each of said sidewalls of said insert box; and
said insert box being telescopically movable in said cover box on said rail members.

3. The junction box of claim 2 wherein said opening in said cover box is further characterized as being located in said sidewall adjacent said closed end.

4. The junction box of claim 3 wherein said cover box is further characterized as having stop means to prevent said insert box from being telescopically movable to cover said opening.

5. A junction box comprising:
a cover box having sidewalls, an open end, and a closed end;
said closed end having at least one hole for communicating the interior of said cover box with a conduit pipe connected to said closed end,
at least one of said sidewalls having an opening for manual access to the interior thereof,
an insert box having sidewalls, an open end, and a closed end;
said closed end having at least one hole for communicating the interior of said insert box with a conduit pipe connected to said closed end,
each of said sidewalls being laterally spaced from said sidewalls of said cover box,
spaced rail members on each of said sidewalls of said insert box,
said insert box being telescopically movable in said cover box on said rail members; and
seal means around said insert box in said lateral space between said sidewalls of said cover box and said insert box.

6. A junction box comprising:
a cover box having sidewalls, an open end, and a closed end;
magnetic shield panels fixed to said cover box for dividing the interior thereof in longitudinal compartments extending from said closed end,
said closed end having at least one hole opening in each of said compartments for connecting the end of a conduit pipe to said closed end,
one of said sidewalls having an opening for manual access to the interior of all of said compartments,
an insert box having sidewalls, an open end, and a closed end;
said closed end having at least one hole aligned with each of said compartments in said cover box for connecting the end of a conduit pipe to said closed end of said insert box,
each of said sidewalls being laterally spaced from said sidewalls of said cover box,
longitudinal rail members provided on each of said sidewalls of said insert box;
said magnetic shield panels being spaced at the longitudinal edges thereof from said sidewalls of said cover box; and
said insert box being telescopically movable in said cover box and over said magnetic shield panels, on said longitudinal rail members.

7. The junction box of claim 6 wherein: said magnetic shield panels are spaced at the longitudinal edges thereof from said sidewalls a portion of the length thereof; said insert box being telescopically movable in said cover box over said portion of the length of said panels; and said opening for said manual access being located in said one of said sidewalls over the other portion of said longitudinal edges of said panels.

8. A junction box comprising:
a cover box having sidewalls, an open end, and a closed end;
magnetic shield panels fixed to said cover box for dividing the interior thereof in longitudinal compartments extending from said closed end,
said closed end having at least one hole opening in each of said compartments for a conduit pipe connected to said closed end,
one of said sidewalls having an opening for manual access to the interior to all of said compartments,
an insert box having sidewalls, an open end, and a closed end;
magnetic shield panels fixed to said insert box for dividing the interior thereof in longitudinal compartments extending from said closed end thereof,
said closed end having at least one hole opening in each of said compartments for a conduit pipe connected to said closed end of said insert box,
each of said sidewalls being laterally spaced from said sidewalls of said cover box,
longitudinal rail members provided on each of said sidewalls of said insert box;
said magnetic shield panels in said insert box being parallel with and laterally displaced from said panels in said cover box for overlapping movement therebetween; and
said insert box being telescopically movable in said cover box on said rail members.

UNITED STATES PATENT OFFICE
CERTIFICATE OF CORRECTION

Patent No. 3,573,344      Dated April 6, 1971

Inventor(s) Robert C. Snyder

It is certified that error appears in the above-identified patent and that said Letters Patent are hereby corrected as shown below:

In the caption, that portion of the inventor's address reading "LaPorte, Ind. 46360" should read --Michigan City, Ind. 46360--.

Signed and sealed this 19th day of October 1971.

(SEAL)
Attest:

EDWARD M. FLETCHER, JR.
Attesting Officer

ROBERT GOTTSCHALK
Acting Commissioner of P